O. H. GOETZ.
BUMPER.
APPLICATION FILED OCT. 15, 1921.
1,400,674.
Patented Dec. 20, 1921.
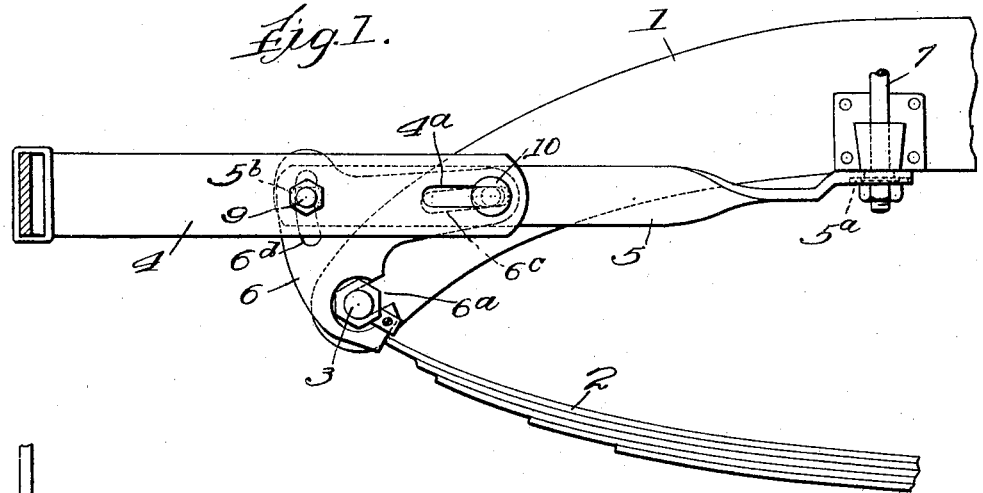
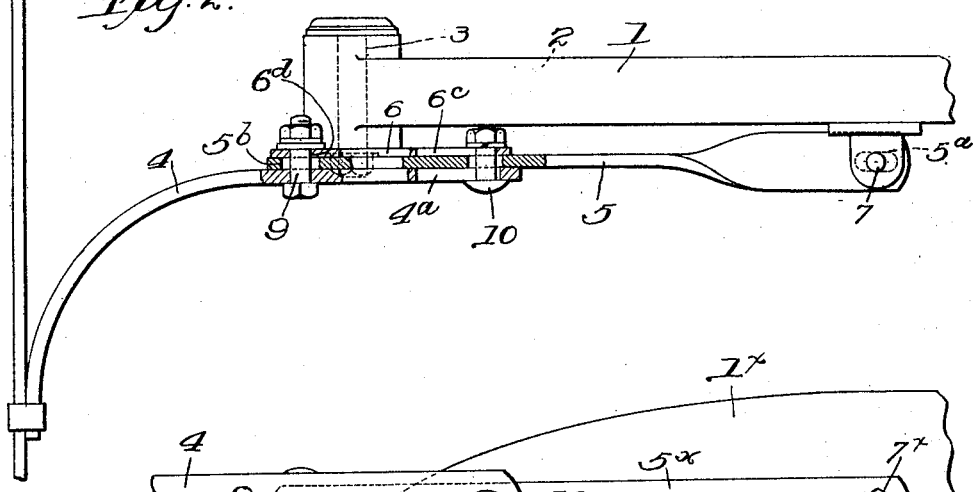
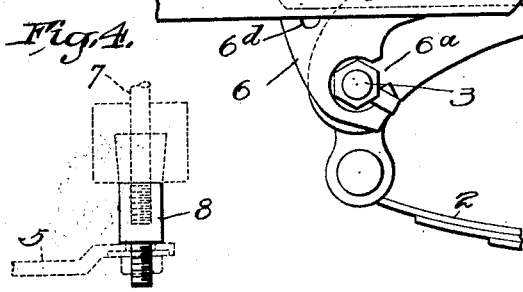
Inventor:
Oscar H. Goetz,
By Burton + Burton
his Attys.

UNITED STATES PATENT OFFICE.

OSCAR H. GOETZ, OF CHICAGO, ILLINOIS, ASSIGNOR TO STEWART-WARNER SPEEDOMETER CORPORATION, OF CHICAGO, ILLINOIS, A CORPORATION OF VIRGINIA.

BUMPER.

1,400,674.                 Specification of Letters Patent.      Patented Dec. 20, 1921.

Application filed October 15, 1921. Serial No. 507,926.

*To all whom it may concern:*

Be it known that I, OSCAR H. GOETZ, a citizen of the United States, and a resident of Chicago, in the county of Cook and State of Illinois, have invented certain new and useful Improvements in Bumpers, of which the following is a specification, reference being had to the accompanying drawings, forming a part thereof.

The purpose of this invention is to provide an improved construction of mounting means for a bumper on an automobile having fore-and-aft extending side bars a shackle bolt connection on said side bar to the vehicle-supporting springs. It consists in the elements and features of construction shown and described, as indicated in the claims.

In the drawings:—

Figure 1 is a side elevation showing a portion of the forward end of an automobile including the side bars and springs equipped with the bumper-mounting devices which constitute this invention.

Fig. 2 is a plan view of the construction shown in Fig. 1.

Fig. 3 is a view similar to Fig. 1, showing the embodiment of this invention upon the side bar of an automobile, utilizing for the rear end connection of the characteristic link member a horizontally-extending instead of a vertically-extending bolt on the vehicle side bar.

Fig. 4 is a detail view of a bolt extensor used when needed at the rear end attachment of the device to the vehicle side bar.

In the construction shown in the drawings, 1 represents the right hand side bar of an automobile of the type in which such side bars extend fore-and-aft and have shackle bolt connections with the vehicle supporting springs; 2, being the spring and 3 the shackle bolt connected with said side bar, 1. 4 is a bumper-supporting arm of customary form, being a flat spring bar set vertically edgewise having its rear end portion extending directly fore-and-aft with respect to the vehicle and lapping by the forward end of the vehicle side bar, 1, a short distance,—that is to say, extending past the vertical plane of the shackle bolt. 5 is a link bar which is adapted to serve as a rearward extension of the bumper supporting arm, 4, being a flat bar extending from a point on the vehicle side bar where a bolt connection can be readily taken advantage of at a point relatively remote rearwardly from the shackle bolt, said link member extending forwardly from its said rearward bolt connection, lapping by the rear end portion of the bumper arm, 4, a sufficient portion of the length of the two parts to afford opportunity for two bolt connections, 9 and 10, securing them together at points far enough apart to insure their perfect rigidity with each other as against pivotal action about either bolt connection when the bolts are clamped tightly enough to prevent sliding. As shown, and preferably, this lapped area is so situated and of such extent that the forward connection by the bolt, 9, may be obtained a little forward of the vertical plane of the shackle bolt, and the rear connection by the bolt, 10, a few inches rearward of said plane. In the construction shown in Figs. 1 and 2, advantage is taken of the bolt, 7, which secures the fender to the side bar, for the rear-end bolt connection of the link, 5, the connection being made by removing the nut from the lower end of the bolt, 7, and applying the rear end of the link, 5, which has a bolt aperture for the purpose, over the end of the bolt, and re-applying the nut. In some instances the curve of the forward end portion of the vehicle side bar is such that the protruding end of the fender-securing bolt is not quite low enough to afford the most desirable point of attachment of the rear end of the link, 5, and in such case a bolt extensor, 8, (see Fig. 4) may be applied to the lower end of the bolt and the rear end of the link applied over the threaded end of the extensor, as seen in Fig. 4. For certain purposes and under certain circumstances, as hereinafter pointed out, the bolt-holes, $5^a$, for engagement of the rear end of the link with the bolt 7, on the vehicle side bar is elongated to adapt it to fit the short range of fore-and-aft adjustment at this point of connection, and the bolt hole is shown thus elongated in Figs. 1 and 2 of the drawing. At the lapped area of the link upon the cross bar where the two parts are to be connected by bolts, as above indicated, proper bolt apertures are provided on both parts. Preferably, for the purpose of accommodation to varying dimensions of vehicle side bars to which the bumper may be attached, the bolt aperture in the bumper arm, 4, for the rear of these two bolt connections is elongated as seen at $4^a$, and at the forward of these connections the bolt aperture in the link bar, 5, is elongated as seen at 5ᵇ. 6 is a bracket adapted for engagement by the shackle bolt, preferably by having in its rear edge a notch, 6ᵃ, giving said bracket the form of a rearwardly-open hook which may be engaged with the shackle bolt upon partly withdrawing the nut and then re-setting the latter. This bracket is in general in triangular form, having beside the hook terminal for engaging the shackle bolt a bolt aperture, 6ᶜ, at the rear upper corner, and an up-and-down-extending slot 6ᵈ, for the bolt aperture at the forward upper corner. The apertures, 6ᶜ, and 6ᵈ, are positioned and spaced so that they may register with or lap on or across the bolt apertures at which the bumper arm, 4, and link bar, 5, are connected, the aperture, 6ᶜ, registering with the slot 4ᵃ, on the bumper arm, and the bolt hole, 5ᶜ, of the link bar, and the up-and-down-extending slot, 6ᵈ, registering with or crossing the elongated bolt aperture, 5ᵇ, of the link bar across bolt aperture, 4ᵇ, of the bumper arm. It will be seen that the elongation of several of these bolt apertures as mentioned, permits a considerably wide range of adjustment of the three parts, viz.,— the bumper arm, 4, the bumper arm extension link bar, 5, and the bracket, 6, to accommodate the various distances rearward from the vertical plane of the shackle bolt at which there may be found on the vehicle side bar a bolt for connecting the rear end of the link, 5, or, more specifically, for accommodating the various distances at which the fender-securing bolts may be found on the side bar. It will be understood that in all cases it will be the purpose to cause the bumper arm, 4, and the extensor link, 5, to stand horizontally, so that the thrust of the bumper rearward may be transmitted directly and with minimum liability of flexing the parts in the connection, to the ultimate securing bolt,—as the fender-supporting bolt, 7. And it will also be understood that in obtaining the direct horizontal thrust, in view of the various positions of the accessible end of the fender-securing bolt or such other bolt as may be available on different cars, the bracket, 6, which, it will be seen, has the function of affording the second point of support for the horizontally-extending parts which is necessary in order to hold them in horizontal position, will be adjusted about its connection with the shackle bolt to vary or permit the variation of the point at which it upholds the bumper arm. In such adjustment, for example, rocking the bracket rearwardly from the position shown in Fig. 1, over the shackle bolt, the connection between said parts at the bolt, 10, will be lowered, and this lowering will be accommodated by the vertically-extended slot, 6ᵈ, in the bracket, in which the bolt, 9, will occupy a lower position, corresponding to the lowered position of the bolt, 10; and when it is necessary to elevate the point of support of the bumper arm afforded by the bracket, the latter is rocked in the opposite direction, carrying the bolt, 10, upwardly, the bolt, 9, being accommodated in this upward movement by the upper portion of the vertically-extending slot, 6ᵈ.

Upon consideration of this structure, it will be observed that the adjustment referred to and described to accommodate the variant position at which a suitable bolt may be found on the vehicle side bar for attaching the rear end of the extensor link, 5, does not require a rearwardly-extending arm of the triangular bracket member, 6, or any connection of such an arm to the other parts, and that a mere link, such as would be the form of said bracket with its rearwardly-extending arm cut off, said link connecting the shackle bolt with the forward bolt connection 9, of the bumper arm and the extensor link, would serve the purpose of an up-and-down-adjustable forward support for the bumper arm which could be properly related with the rear support at the bolt, 7, according to the height at which the latter bolt might be found available. But the rearward extension of said bracket, making it L-shape or triangle-shaped, and the engagement at its rear end with the bolt, 10, at the connection of the rear end of the bumper arm with the extensor link bar, transmit the rear thrust largely to the shackle bolt, and very greatly increases the efficiency of the structure for defeating rearward slipping of the parts at the slotted bolt connection which it would be the tendency of the rearward thrust of the bumper to cause; because with this rear extension of the bracket the rearward thrust upon the bumper arm, 4, in order to effect any slippage, must not only overcome the frictional resistance at the clamped point, but must also rock the bracket over its fulcrum on the shackle bolt, thereby carrying the rear end downward, which could only be effected by causing a slippage in the up-and-down slot, 6ᵈ, of the bracket, and in view of the leverage operating unfavorably to such slippage it would be defeated by a very easily obtainable degree of tightness of the clamping bolt, 9, at this point.

I claim:—

1. In an automobile having fore-and-aft extending side bars with shackle bolt connections to the vehicle supporting springs, in combination with such side bar, a bumper support comprising a bracket member adapted to be engaged with the shackle bolt; a link member having a hole for engagement with a remotely rearwardly situated bolt on the vehicle side bar and extending thence forwardly and lapping alongside the bracket member, said lapping members having at their lapped areas bolt apertures one of which is elongated in up-and-down direction; a bumper arm which extends rearwardly lapping the lapped area of said bracket and link and having a bolt hole for securement to the link and bracket by a bolt which connects them at their lap, said bumper arm and link having additional bolt apertures adapted to register at their lapped areas rearward of said bolt one of which last mentioned apertures is elongated in fore-and-aft direction, and a bolt for clamping said bumper arm and link together at said registered apertures.

2. In the construction defined in claim 1, foregoing, the first mentioned elongated bolt aperture being in the bracket.

3. In the construction defined in claim 1, foregoing, the second mentioned elongated bolt aperture being in the bumper arm.

4. In an automobile having fore-and-aft extending side bars with shackle bolt connections to the vehicle supporting springs, in combination with a side bar a link adapted for connection to said vehicle side bar and a bolt situated thereon remotely rearward from the shackle bolt; a bumper arm extending rearwardly lapping the forward part of the length of the link, said link and bumper arm having each two registered bolt apertures at a substantial distance apart along their length, whereby they may be secured together rigidly as against relative pivotal movements; bolts for so connecting them at said two points, and a bracket adapted for engagement with the shackle bolt lapping in part the lapped area of the link and bumper arm and having an up-and-down extending slot positioned for engagement by one of the bolts which connects the bumper arm and the link.

5. In an automobile having fore-and-aft extending side bars with shackle bolt connections to the vehicle-supporting spring, in combination with a vehicle side bar, a bumper arm and a link member adapted to constitute an extension thereof, the bumper arm extending rearward alongside the side bar past the shackle bolt, the link extending alongside the side bar from a point forward of the shackle bolt to a point remotely rearward thereof, whereby there is obtained a substantial area and length of lap of the bumper arm and the link in the vicinity of the shackle bolt; bolt connections at the two ends of the links to the side bar and bumper arm respectively, one of the parts at one of said connections having an elongated bolt aperture to accommodate variation in the rearward remoteness from the shackle bolt of the rear end attachment of the link to the side bar, and a bracket engaged with the shackle bolt and secured to the link and bumper arm at their bolt connections with each other.

6. In the construction defined in claim 5, foregoing, the bracket having the bolt aperture for its securement to the bumper arm and link elongated in up-and-down direction to accommodate variation in the height of the rear link attachment to the side bar.

7. In an automobile having fore-and-aft-extending side bars with shackle bolt connections to the vehicle-supporting spring; in combination with such side bars, a bumper-supporting arm and an extensor link therefor, said link being engaged with a bolt positioned remotely rearward from the shackle bolt on the side bar; the bumper arm and extensor link being lapped alongside each other at the rearward portion of the bumper arm and the forward portion of the link; bolts by which they are clamped together at fore-and-aft separated points in the range of said lap; a bolt hole at each of said connections being elongated to permit longitudinal adjustment of the two parts upon each other at their lap; a bracket engaged with the shackle bolt and with both of the clamping bolts which secure the bumper arm and extensor link together; the aperture in the bracket for engaging the forward of said two bolts being alongated in up-and-down direction.

In testimony whereof, I have hereunto set my hand at Chicago, Illinois, this 10th day of October, 1921.

OSCAR H. GOETZ